United States Patent [19]
Velte

[11] Patent Number: 6,063,459
[45] Date of Patent: May 16, 2000

[54] ANTENNA ORNAMENT

[76] Inventor: Stephen K. Velte, 8105 Bay Dr., Tampa, Fla. 33635

[21] Appl. No.: 08/897,709

[22] Filed: Jul. 21, 1997

[51] Int. Cl.⁷ .................................................. B60R 13/00
[52] U.S. Cl. ................................................................ 428/31
[58] Field of Search ......................................... 428/31, 28

[56] References Cited

U.S. PATENT DOCUMENTS

| | | | |
|---|---|---|---|
| 2,764,122 | 9/1956 | Irvin | 428/31 X |
| 3,241,857 | 3/1966 | Goetz | 428/31 X |
| 3,526,050 | 9/1970 | Weller | 428/31 X |
| 4,219,218 | 8/1980 | Waldon | 428/31 X |
| 4,526,820 | 7/1985 | Haas . | |
| 4,875,431 | 10/1989 | Dobosz | 428/31 X |
| 4,960,067 | 10/1990 | Currie | 428/31 X |
| 4,972,795 | 11/1990 | Mace . | |
| 5,636,588 | 6/1997 | Keller | 428/31 X |
| 5,665,438 | 9/1997 | Lee et al. . | |

*Primary Examiner*—Deborah Jones
*Assistant Examiner*—Jason Savage
*Attorney, Agent, or Firm*—Pendorf & Cutliff

[57] ABSTRACT

An ornament for an antenna comprising a flexible, generally planar body having first and second surfaces and a plurality of apertures, the apertures extending along a line and dimensioned to receive the antenna therethrough, the planar body sufficiently flexible and resilient to bend between a flat state and a bent state, wherein when the ornament is in the bent state the antenna can easily pass through the apertures and when the ornament is released from the bent state the ornament tends to revert to the flat state, thereby being securely mounted to the antenna.

24 Claims, 7 Drawing Sheets

ANTENNA ORNAMENT

BACKGROUND OF THE INVENTION

1. Field of the Invention

This invention relates to an antenna ornament having a generally planar body including a surface area to display various caricatures, slogans, and the like reflective of individual personality traits and inclinations, particularly for use on vehicle antennas.

2. Description of the Related Art

Various vehicle antenna ornaments have been utilized as novelty items to indicate allegiance to various colleges and professional sporting teams, to personalize the vehicle, to enhance the stylistic potential of the vehicle, or to indicate participation in a procession such as a funeral motorcade. More practically, antenna ornaments have been used to enable an owner or operator to readily spot the vehicle in a crowded parking lot.

The vehicle antenna ornament generally comprises a display part bearing ornamentation and a securement part for securing the ornament to the vehicle antenna. A large variety of rigid and flexible, two dimensional and three dimensional vehicle antenna ornament designs have been set forth in the prior art, and various mechanisms have been developed for securement of the display part to an associated vehicle antenna. However, these securement mechanisms have heretofore had a relatively complex or awkward structure. Further, these vehicle antenna ornaments are generally bulky, taking up much display space at the point-of-sale, thus limiting the variety of vehicle antenna ornaments which can be displayed in a given area, and reducing the profit per given display area.

For example, U.S. Pat. No. 4,960,067 (Currie) teaches an antenna signal device, the body of which includes a tab member foldable about an upper end of the antenna to define a "U" shaped securement portion. The body further includes spaced parallel slots for receiving a flexible line to mount the apparatus to the antenna. Additional hooks, loops, straps, and slots may be included to enhance securement of the device to the antenna. Such a vehicle antenna ornament is cumbersome, is awkward to install, and does not look professional or aerodynamic when mounted on an antenna.

A variety of ornaments have been devised which are simple to install, generally having a tubular shape with a central cavity for receiving an antenna, as disclosed for example in U.S. Pat. No. 5,636,588. However, these devices present a large cross section area to the wind, generally at or near the top of the vehicle antenna, and thus tend to cause excessive bowing of the antenna at speed.

Although flag or banner type ornaments tend to have a relatively low coefficient of drag, one of the major problems associated with the use of flag or banner type antenna ornaments is their susceptibility to wind currents. For example, it is not unusual for pennants to shred due to the severe flapping they are prone to. The prior art has addressed this problem by means of a wind deflection device. U.S. Pat. No. 4,875,431 (Debosz) teaches a wind deflection device which snaps onto and grips a vehicle antenna bearing a pennant, and functions to reduce the action of wind upon the pennant. A problem inherent in this approach is that it requires the mounting of a supplemental part onto the antenna in order to adequately protect the ornament from damage by the wind, trading away simplicity for longevity of the ornament. Further, by deflecting wind, the device increases drag and causes bowing of the antenna when the vehicle is moving at a high rate of speed.

Yet another problem associated with such antenna ornaments as banners and pennants is that, to be decipherable, they require wind to animate them. Too much wind causes excessive flapping, making these types of ornaments difficult to decipher by the casual observer. Further, vehicles are often parked and, when in such a state, the banners and pendants are collapsed and illegible. This problem is particularly well known to scuba divers who are required to display a dive flag while diving. Such a flag is visible and legible only when wind is blowing. To overcome this problem, many plastic dive flags are provided with a wire which must be straightened each time a dive flag is unfurled. However, these wires break easily and plastic dive flags tend to have a short life. Further, dive flags are generally provided with two eyelets, and require string or rope to be secured to a mast, generally a marine radio antenna. A diver will frequently forget to bring string, and thus will not be able to tie the flag to the antenna. Further, if the flag is tied to the antenna, it is difficult to untie the flag, and thus the mounting strings are either cut or the flag is left mounted when it should be lowered. There is a need for a dive flag which can be easily installed to and removed from a marine radio antenna, which presents a dive emblem even in an absence of wind, which dive flag requires no maintenance, has long life, is simple and economical to manufacture, and easy to operate.

There is thus a need for an antenna ornament that inherently resists the action of wind currents upon the ornament, that has a low coefficient of drag, that is constantly displaying the ornamentation, and nevertheless is economical to manufacture, intuitively simple to understand and install, and refined in appearance once installed.

Accordingly, what is needed is an antenna ornament which overcomes the above deficiencies and provides a means for enhancing the individuality, distinctiveness, and stylistic potential of a vehicle, or any antenna-bearing device, such as a portable radio.

SUMMARY OF THE INVENTION

Having considered the deficiencies inherent in the above described antenna ornaments, and desirous of providing a new type of antenna ornament which overcomes all the above problems, the present inventor conducted extensive experimentation and as a result developed an antenna ornament which is light-weight and simple in construction, has a low coefficient of drag, is easy to mount, is always in the display position, and resists the action of wind upon the ornament.

To attain this, the antenna ornament of the present invention includes a generally planar body having a display part and a mounting part, the display part bearing some or all of the ornamentation, the mounting part including a plurality of apertures which extend through the planar body, and adapted for receiving a vehicle antenna therethrough. The planar body is suitably resilient and can be slightly bowed and deformed as necessary to orient the apertures such that the apertures receive and retain the antenna therethrough.

The significance of the simple design is that the entire device is generally flat and easily displayed and stored. More importantly, the mounting means is integral with the flat device, is immediately understood, and requires no step of looping, folding, adhering, snapping, etc. The vehicle antenna ornament is thus simple to understand and install, yet is durable, has no moving parts which can break, has low drag, and is permanently in the condition of displaying the ornamentation. The device is inexpensive to manufacture, and thus can be sold for a price at which the purchaser need not worry about theft of the device.

The vehicle antenna ornament planar body is preferably made by stamping a flexible light-weight plastic sheet and can thus be manufactured at low cost. Further, designs can be easily changed by changing the design of the stamp outline or the design of the ornamentation printing. For non-planar vehicle antenna ornament, the body may be molded into a shape conducive to receiving various printed caricatures, slogans and the like.

As with any planar shape, the vehicle antenna ornament has two sides, each side of the planar body having a surface area bearing printing with qualities suitable for exposure to outside elements.

The vehicle antenna ornament of the present invention is mounted on the antenna in a very simple and intuitively comprehensible manner by simply slipping the terminal end of the antenna through one of the plurality of, preferably two, apertures of the planar body, followed by slipping the terminal end of the antenna through another aperture, from the opposite direction in relation to the planar body, thereby "weaving" the ornament onto the antenna. The ornament is held in place, vertically along the antenna, by the friction created by the flexible planar body being "woven around" the antenna, and by the resilient plastic attempting to return from the deformed, non-planar woven condition to the planar state, whereby the plastic sheet presses against the antenna. The ornament may then be slid further down the antenna to the desired height and can subsequently be easily readjusted, as desired. When in place, the vehicle antenna ornament performs in the manner of a weather vane. To remove the ornament, the process is reversed.

The variety of designs, logos, or caricatures printable on the planar body of the ornament is limited only by the imagination. For example, the design or caricature printed on the surfaces of the planar body may be shown as being "blown" horizontally by the wind, or may be vertically oriented to incorporate the structure of the antenna into the ornament design, or a combination of the two.

Further, other indicia that may be printed on the planar body of the ornament includes slogans, trendy catchphrases, mascots, or various licensed characters, such as sports figures or comic characters. For example, anything that may be printed on a bumper sticker, may be printed on the antenna ornament. Unlike a bumper sticker however, the present invention is easily removable. The antenna ornament may be used as a promotional item in, for example, a school fund-raiser. The antenna ornament may also be an identifying marker for vehicles utilized in, for example, pizza delivery.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other antenna ornaments for carrying out the same purposes of the present invention. It should also be realized by those skilled that such equivalent structures do not depart from the spirit and scope of the inventions set forth in the appended claims.

BRIEF DESCRIPTION OF THE DRAWINGS

For better understanding of the present invention, reference is made to the accompanying drawings, which are incorporated herein by reference and in which.

DETAILED DESCRIPTION OF THE INVENTION

Figure 1:
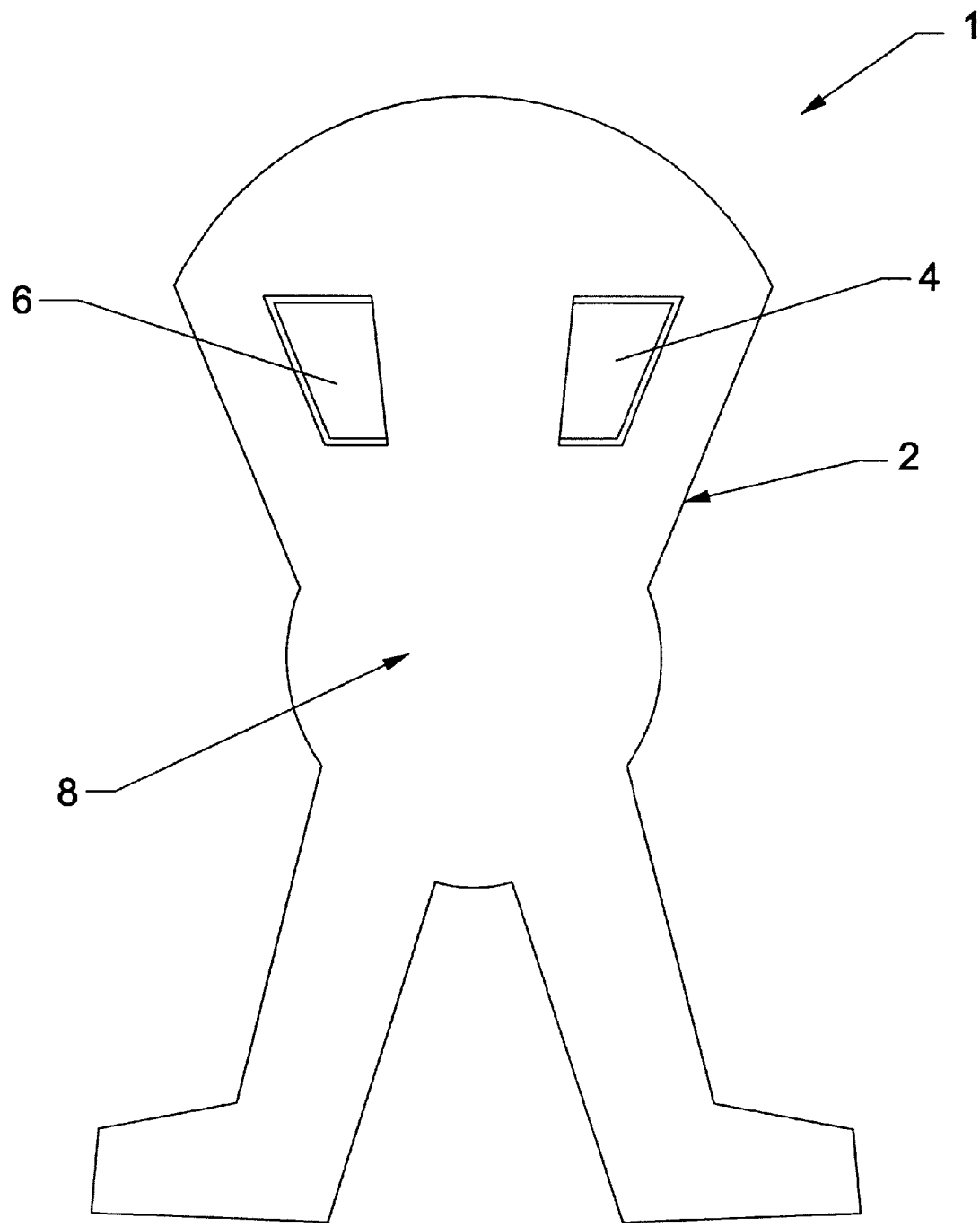
FIG. 1: shows the front view of a first preferred two-aperture embodiment of the present invention.

Referring now to the drawings, wherein like reference numerals illustrate corresponding or similar elements, FIG. 1 illustrates a first preferred embodiment of the vehicle antenna ornament 1 of the present invention. The ornament 1 includes a planar body 2 with integral mounting means, comprising a plurality of apertures 4,6, which extend through the planar body 2. Preferably, the planar body 2 is sufficiently generally planar, even when mounted, to minimize wind resistance and remain parallel to the direction the vehicle (not shown) is moving, in the manner of a weather vane.

The apertures 4,6 are of sufficient width, and appropriately spaced apart, for receiving and retaining an antenna (not shown) therethrough. The planar body 2 is constructed of a suitably resilient material, preferably an elastomeric plastic, which enables the vehicle antenna ornament to deform to receive and retain the antenna through the apertures.

The first embodiment, as shown in FIG. 1, has only two apertures, a first aperture 4 and second aperture 6, for ease of mounting and removal. The planar body 2 has two, preferably flat, surfaces, a first surface 8 and a second surface (not shown), and is preferably a flexible light-weight plastic which is susceptible of a low cost of manufacture through stamping or molding processes which are well known to those skilled in the art. Preferably, the plastic, planar body is flexible and can be bent by application of light force, but has shape memory, reverting to its original shape when the force is removed. Both indicia bearing surfaces of the planar body 2 can be printed or otherwise decorated over part or all of their surface area with printing of a quality suitable for prolonged exposure to outside elements, such printing with an ultraviolet radiation, rain, and hot and cold temperature resistant ink, thereby precluding damaging the vehicle bearing the ornament.

During manufacture, the planar body 2 may be stamped or molded into a shape conforming to the various printed caricatures, slogans and the like. For example, if the printed image is a character with arms and/or legs, the planar body 2 may be stamped or molded to include areas or projections on which to bear the printed arms and/or legs.

Figure 2:
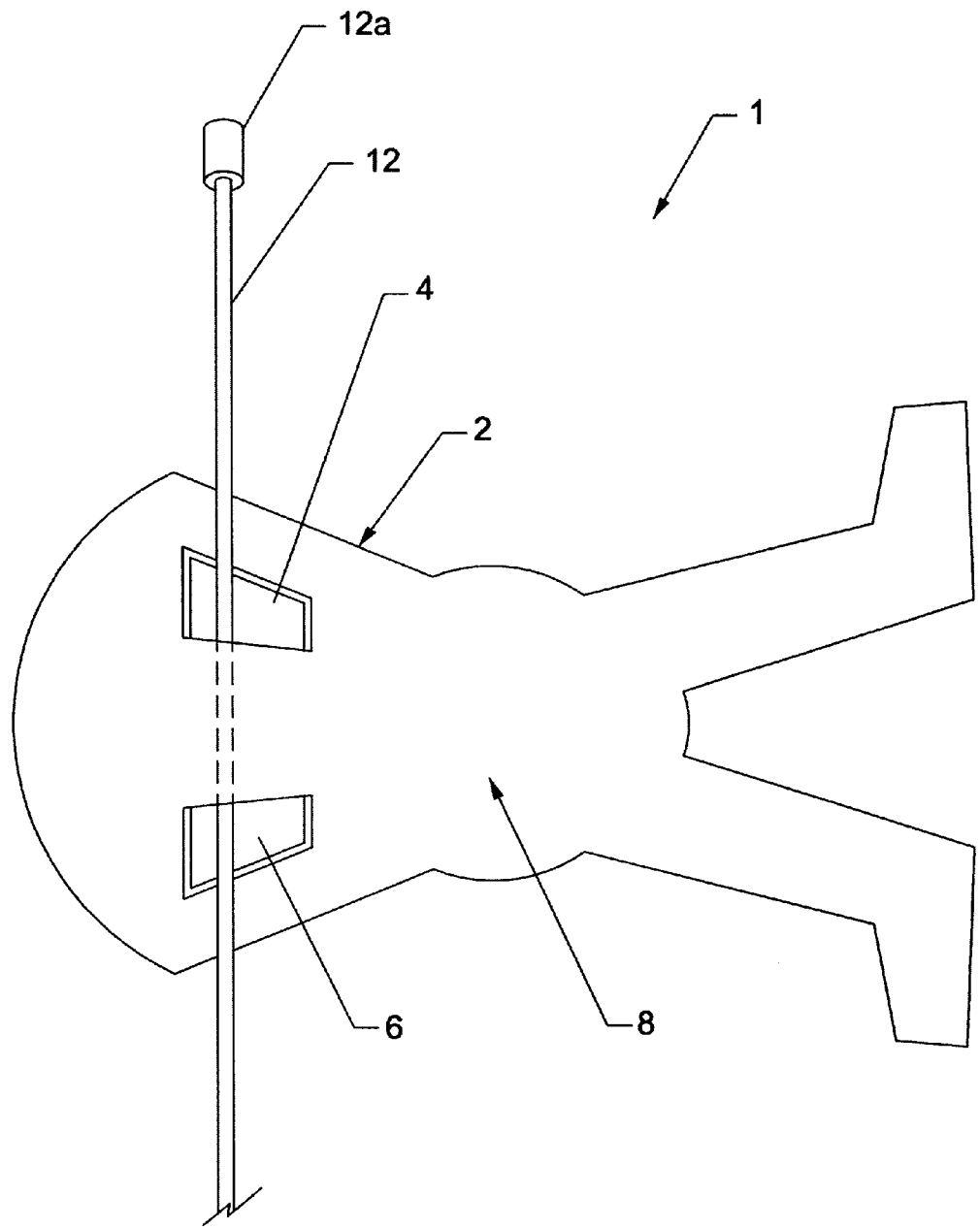
FIG. 2: shows the front view of the embodiment of FIG. 1 mounted on an antenna.

FIG. 2 shows the embodiment of FIG. 1 mounted upon an antenna 12. As shown, the antenna 12, which has a terminal end 12a, is "threaded" or "woven" through the first and second apertures, 4 and 6 respectively. The ornament 1 is mounted on the antenna 12 by simply slipping the terminal end 12a (shown in FIG. 3) of the antenna 12 through the first aperture 4 of the planar body 2, followed by arcing or bending the planar body 2 and slipping the terminal end 12a of the antenna 12 through the second aperture 6, from the opposite direction in relation to the planar body 2, thereby "weaving" the ornament 1 onto the antenna 12. As previously discussed, the planar body 2 must be flexible yet resilient, permitting an angle of deflection or bowing sufficient to slip the antenna terminal end 12a through the second aperture 6. The ornament 1 is held in place, vertically along the antenna 12, by the friction created by the flexible planar body 2 being "woven around" the antenna 12, the bowed ornament being resilient and tending to revert to the original planar shape. The width and placement of the apertures 4 and 6 are appropriately positioned on the planar body 2 that, when taken with the resilience and friction of the plastic, the vehicle antenna ornament is held in place on the antenna for long periods of time despite the action of high winds. The ornament 1 may then be slid further down the antenna 12 to any desired height and subsequently adjusted as desired. In the case of thin or flexible antennas, it may be desirable to slide the vehicle antenna ornament further down the antenna. In order to minimize any possibility of oscillation of the antenna 12 at high speeds, it is preferable that the ornament actually be placed on the lower half of the antenna 12. To remove the ornament, the process is reversed. Further, it should be understood that the apertures are preferably wide enough in diameter to accommodate varying sizes of antenna terminal ends 12a.

It should also be understood that, because of the planar body's 2 characteristic flexing, or bowing, there may be some difficulty experienced in positioning the ornament 1 over the bottom half of retractable antennas, due to their incrementally increasing width.

Figure 3:
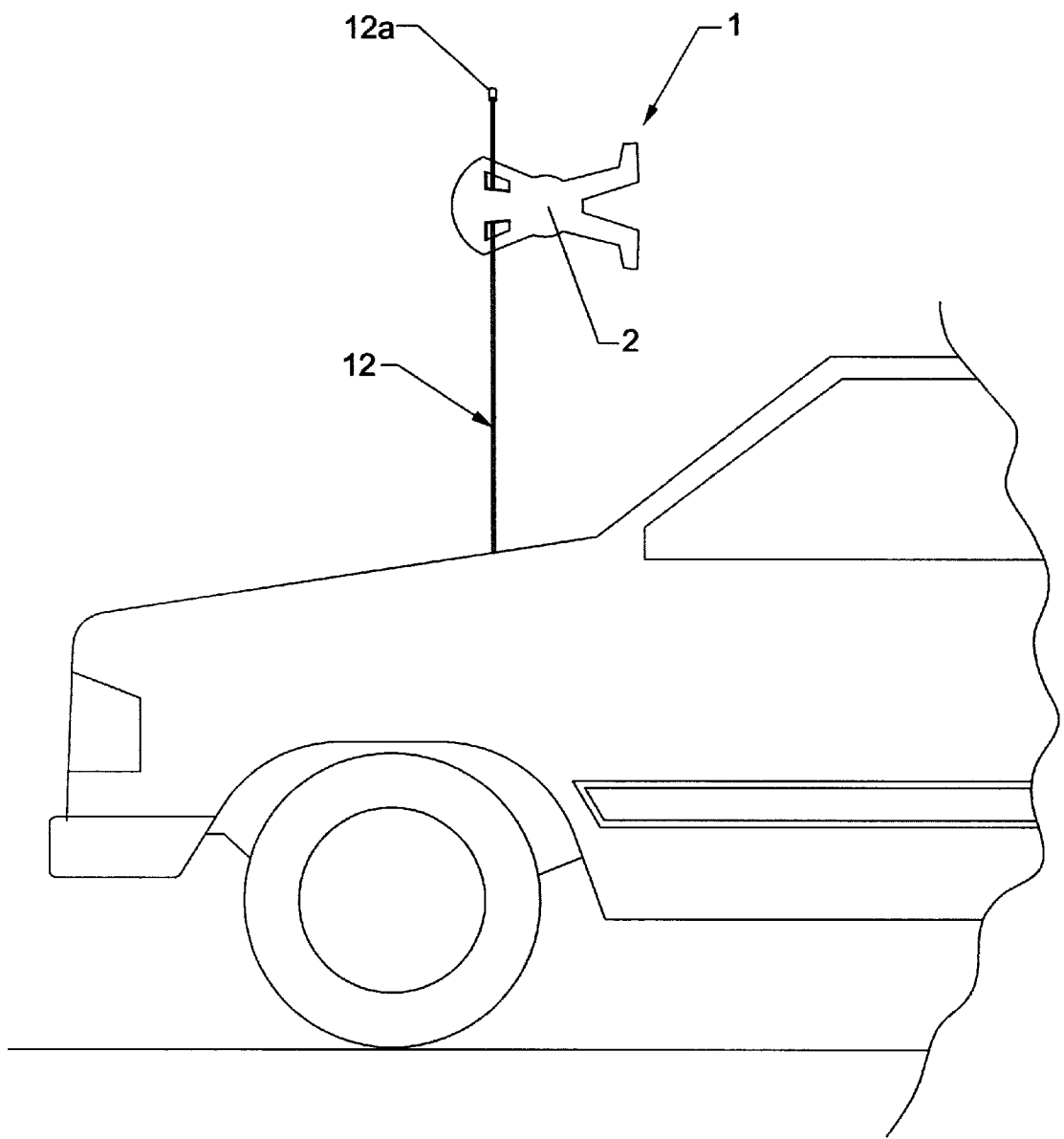
FIG. 3: shows the embodiment of FIG. 1 as it appears mounted on the antenna of a car.

The planar body may be further adjusted axially so that its ornamented surface 8 is parallel with the longitudinal axis of vehicle, as shown in FIG. 3, thereby allowing any image printed upon the ornament 1 to be readily decipherable to the casual observer who is laterally adjacent the vehicle. Due to the planar nature of the ornament 1 and the friction between the antenna 12 and the planar body 2, the axial orientation of the ornament 1 on the antenna will generally conform to the wind direction. Therefore, when the ornament 1 is axially positioned on the antenna 12 to be parallel to the length of a vehicle, any image printed upon the ornament 1 will be readily decipherable to the casual observer who is laterally adjacent the vehicle.

Figure 4:
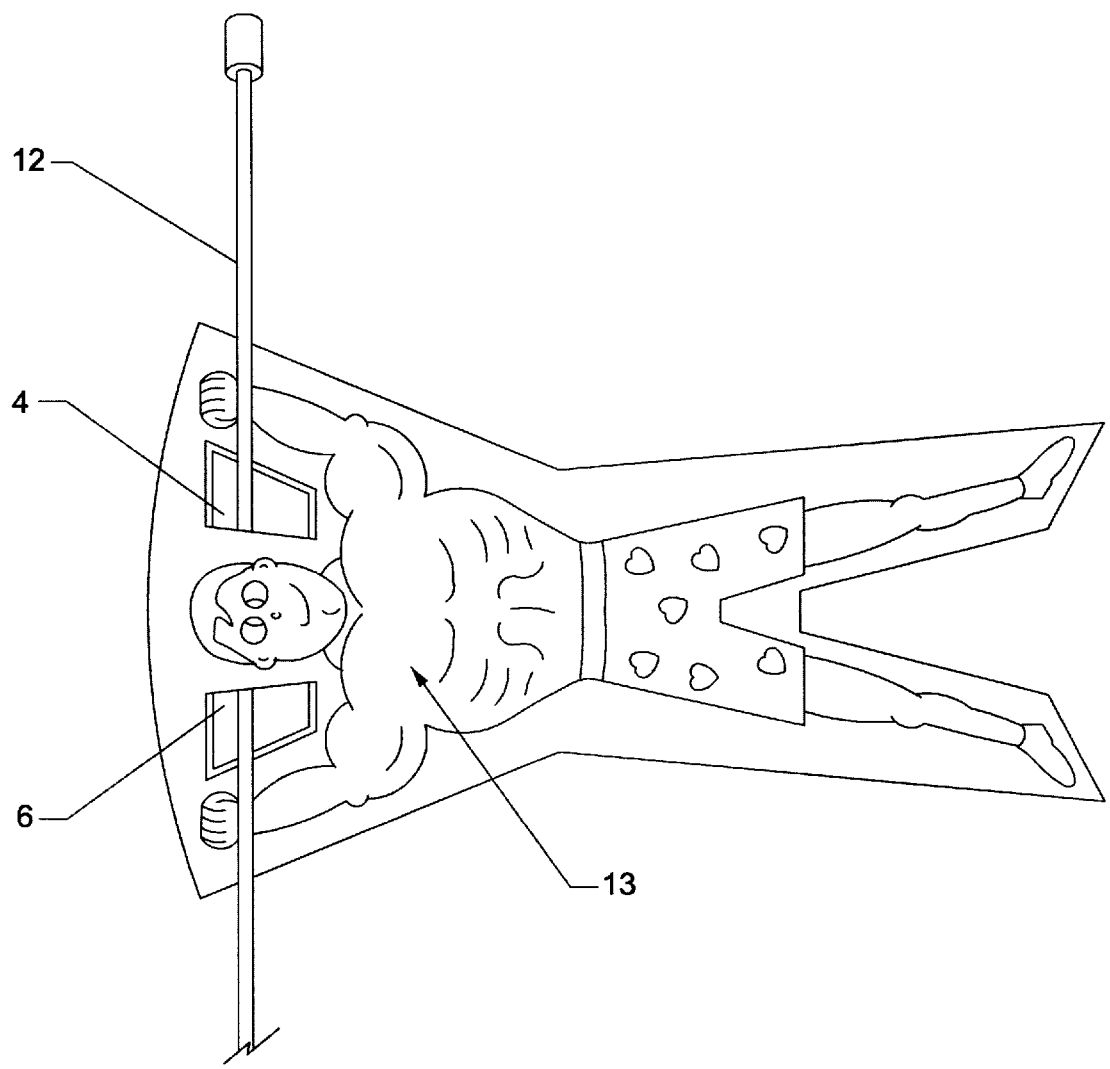
FIG. 4: shows a front view of an embodiment with an example of a character printed upon the planar side of the ornament, rendered in generally horizontal orientation.
Figure 5:
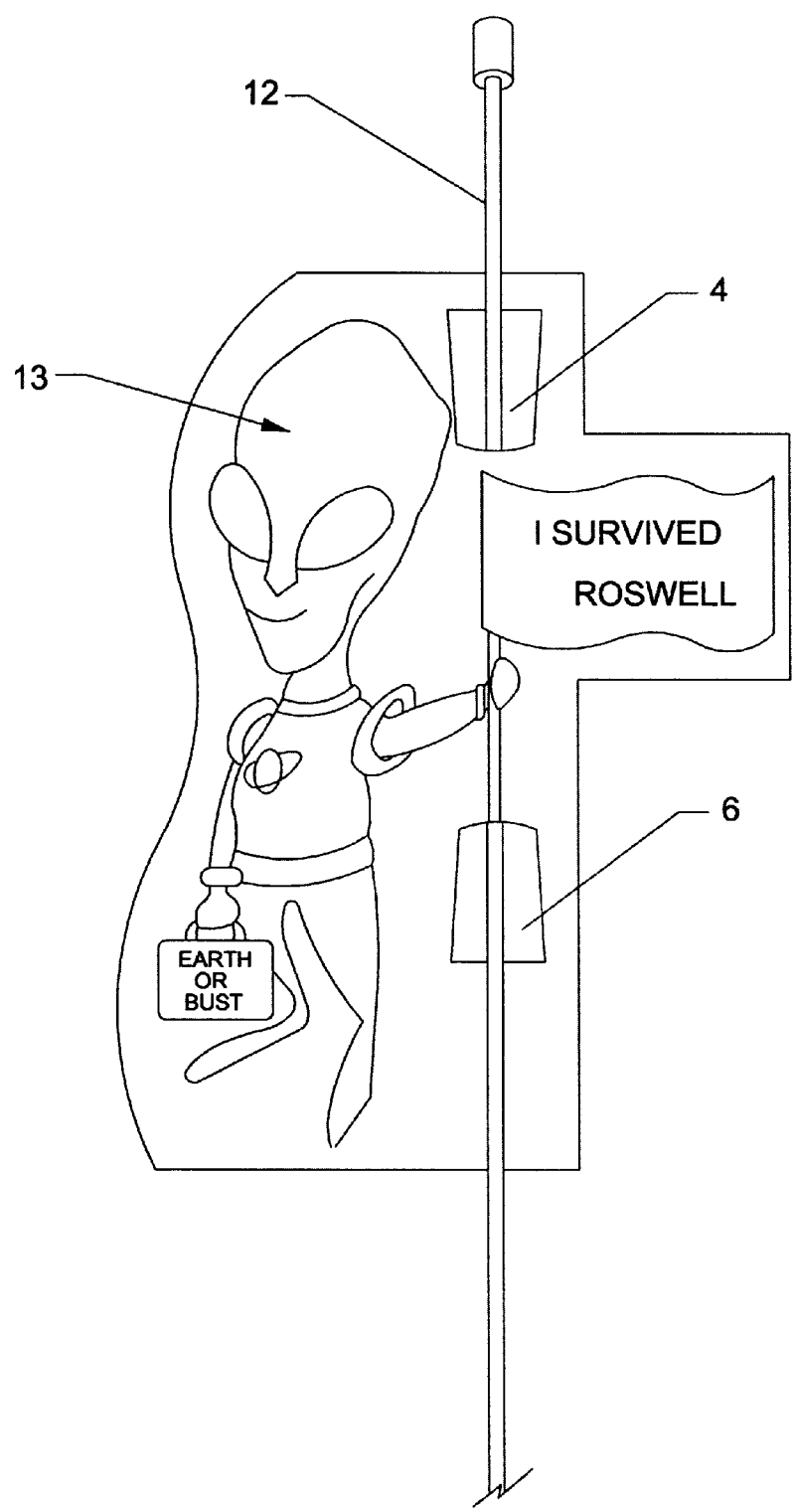
FIG. 5: shows a front view of an embodiment with an example of a character printed upon the planar side of the ornament, rendered in generally vertical orientation.

In addition, the design or caricature printed on the surfaces of the planar body 2 may be rendered such that the design or caricature is horizontally oriented, to mimic motion along that line of direction, as shown in FIG. 4. In FIG. 4, specifically, a printed character 13 and the shape of the planar body 2 cooperate so that it appears the character 13 is holding on to the antenna 12 with its hands. Alternatively, the design or caricature printed on the surfaces of the planar body 2 may be rendered such that it is vertically oriented, to incorporate the vehicle antenna 12 within its design, as shown in FIG. 5, or a combination of the two.

The planar body 2 may be any color or combination of colors, and may include transparent areas. A bright color is preferred in order to distinguish the vehicle from others in a parking lot. Additionally, the planar body 2, and/or the image printed upon the planar body 2, may be imbued with phosphorescent "glow in the dark" qualities.

It should also be understood that, while a substantially planar body 2 is preferred, other embodiments conducive to the printed image are contemplated by the inventor. For example, if the printed image is a shark or fish, tabs or projections (not shown) decorated as fins, may be molded to project from the otherwise planar body 2 to produce a three-dimensional effect that is more prone to catch the eye. Further, the thickness and resiliency of the plastic may be so selected as to animate the shark or fish and give it an appearance of "swimming through the air" as the vehicle proceeds down the road.

It should further be understood that more than one antenna ornament 1 may be mounted on an antenna 12. Accordingly, while one antenna ornament is preferably mounted on substantially the bottom half of the antenna 12, another ornament may be mounted, more visibly, near the antenna terminal end 12a, in order to make the vehicle readily distinguishable in a parking lot. For example, a licensed character printed on a first mounted antenna ornament may be depicted flying a kite that is printed upon a second ornament (not shown), which is mounted, more visibly, near the antenna terminal end 12a.

Figure 6:
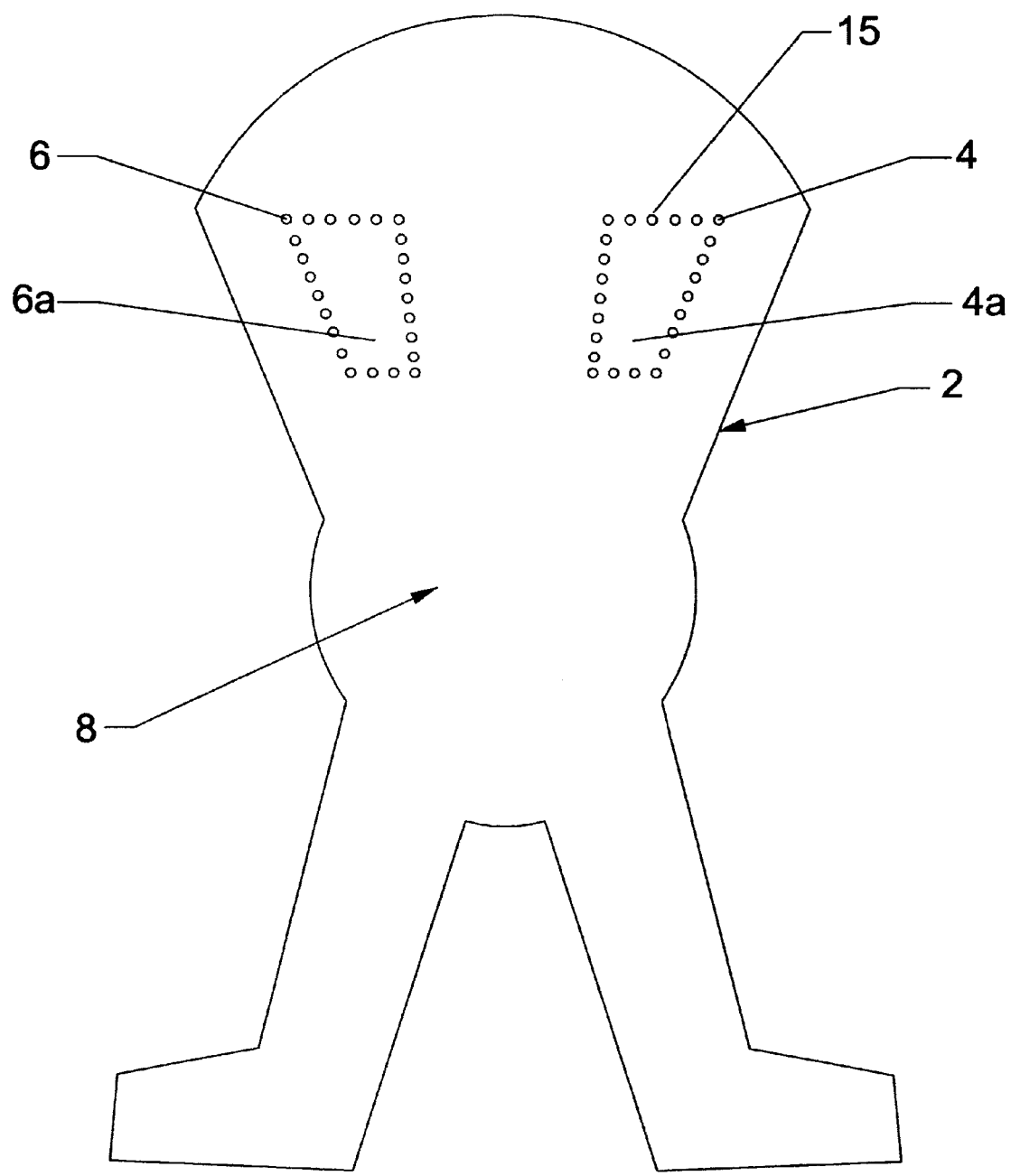
FIG. 6: shows the "perforated embodiment", with apertures bearing perforatedly attached aperture filler members.

In yet another embodiment of the present invention, shown in FIG. 6, the apertures 4 and 6 of the planar body 2 bear corresponding aperture filler members. The first aperture 4 has an aperture filler member 4a and the second aperture 6 has an aperture filler member 6a. These aperture filler members 4a and 6a are defined by the apertures 4 and 6, respectively, and are attached to the apertures 4 and 6 by a series of perforations 15, slots, or score lines (stamping part way through the plastic to form lines of weakness for easy punch-out separation). In this alternative embodiment, the aperture filler members are formed during the manufacture of the ornament 1, wherein the apertures are created by simply perforation-stamping the planar body 2, as known in the industry. This stamping produces an aperture perforatedly bearing an aperture filler member. This technique is often employed by manufacturers of aperture-bearing articles in order to make the manufacturing process more efficient by externalizing the costs of waste material removal, the waste material being the aperture filler members. This "perforated embodiment" is mounted on the antenna in the same manner as the preferred embodiment; however, the aperture filler members are simply "punched out" of the apertures by hand prior to mounting or, alternatively, are "punched out" of the apertures by the terminal end of the antenna, itself, during the mounting process previously described.

Figure 7:
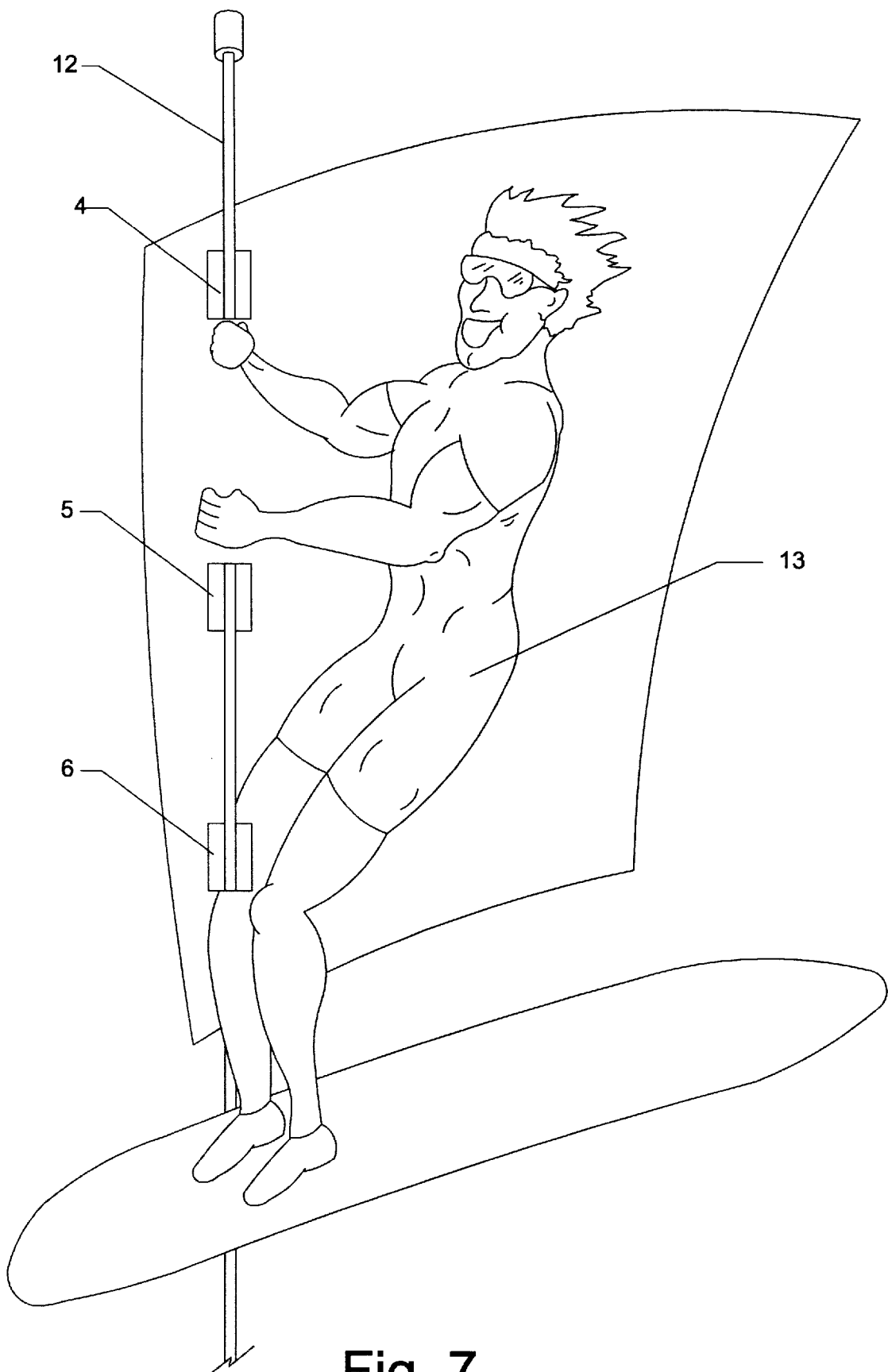
FIG. 7: shows a front view of a three-apertured embodiment mounted upon an antenna.

FIG. 7 shows an embodiment with more than the preferred two apertures, specifically three apertures, 4, 5, and 6. FIG. 7 illustrates that, while only two apertures are preferred for ease of mounting the ornament 1 upon the antenna 12, three or more apertures may be implemented. The printed character 13 is rendered in a generally vertical orientation, while incorporating the antenna within its design and mimicking motion along a horizontal direction.

In the case where the vehicle antenna ornament is made of thermoplastic formulations, it is preferred to use a semi-rigid thermoplastic formulation or a pliable, deformable, resilient thermoplastic elastomer formulation or a combination of the two. The material may be a polyvinyl chloride thermoplastic material which is formulated to be semi-rigid, or may be a thermoplastic elastomer having a Shore A Hardness of from 25 to 98, more preferably from 40 to 80, as defined in the *Handbook of Plastics, Elastomers, and Composites,* Charles A. Harper, Second Ed. 1992, McGraw Hill, and particularly, Chapter 7 entitled "Thermoplastic Elastomers", and in *Plastics Engineering Handbook of the Society of the Plastics Industry,* Michael L. Berins, Fifth ed., 1991, pages 72 and 73. Examples of thermoplastic elastomers include thermoplastic polyurethanes, styrenic block copolymers, copolyesters, olefin blends, rubber olefin alloys, neoprene, urea-formaldehyde, polyvinyl-formaldehyde plastic, polyester resin reacted with aromatic diisocyanates to form a prepolymer which is then reacted with water to form a plastic urethane polymer, phenolformaldehyde resins, and polystyrene, or any other such natural or synthetic material known to those in the art with suitable properties such as resiliency, rigidity, weather resistance, durability, good extrudability or workability, good appearance, good printablity, and impact absorption abilities. See, e.g., U.S. Pat. No. 5,555,913. Examples of semi-rigid polymer include thermoplastic polymer, preferably with a Shore D hardness of from 40 to 74, such as an extrudable polyvinyl chloride, ethylene/methacrylic acid base copolymer, a high density polyethylene copolymer, any of the polyolefins, such as polypropylene and polyethylene, polyethylene terephthalate, polystyrene, acrylonitrilestyrene-butadiene polymer, nylon, acetal polymer, polycarbonate, nitrile resins, polyvinyl alcohol, polysulfone and other semi-rigid to rigid polymers including multipolymers, polymer blends and polymer laminar constructions thereof having enhanced properties such as impact resistance and smooth surfaces.

The selection of specific thermoplastics as necessary to produce any of a wide variety of vehicle antenna ornamental designs is well known to those working in the art and need not be discussed herein in greater detail.

The thickness of the vehicle antenna ornament may vary widely depending upon softness of the material and engineering preferences, but is preferably about 0.5–3.0 mm, more preferably 0.75–2.0 mm, most preferably about 1.0–1.5 mm. A thickness greater than 3 mm does not necessarily provide significant additional durability or resilience to the ornament of the type with which the present invention is concerned, yet is increased in manufacturing cost and may be less deformable and resilient. An ornament of less than 0.75 mm in thickness is reduced in the amount of durability and wind resistance, and less than 0.5 mm generally may not give sufficient stability under high wind conditions.

The dimensions of the vehicle antenna ornament may vary depending upon taste, may vary depending upon use (domestic vs. industrial, e.g., pizza delivery), and is preferably in the range of 5–20 cm on each side, preferably about 10–15 cm on each side.

Since the ornament is flexible, the dye/paint mixture should have sufficient flexibility to prevent cracking and peeling. For this, a form of dye/paint mixture with a latex quality and a strong adhesive property is preferred, or a dye or paint which or includes an adhesive promoter for preventing the color from peeling or flaking while withstanding harsh environments. The adhesion promoter can consist of an acrylic or methacrylic polymer that is added to the coating composition. Many commercially available adhesion promoters are available on the market, for example: SC-462 of SONY Chemicals Co., ACRYPET VH of Mitsubishi Rayon Co., and PARAPET HR1000NP and PARAPET GF100 of Kyowa Gas Chemicals Co. (U.S. Pat. No. 5,130,365 which is incorporated herein by reference). These adhesion promoters can be added directly to the dye/paint mixture.

Coloration may be accomplished by any of a variety of industrial apparatus, such as silk screen printing, roller graveur printing, lithography, etc., but for customization, individualization and detail designs may be painted with an alcohol solvent based air brush paint or dye. One preferred paint is distributed by Graphic Marker International Inc., of Chatsworth, Calif. 91311 under the name Studio Dye™ and comes mixed with an adhesion promoter which imparts a latex or rubber like quality and adheres to almost any surface. However, many commercially available alternatives could be substituted, including DEKA-SignAir™ of Decart Inc., Morrisville, Vt. 05661, Createx Pearlized™ or Createx Auto IR™ acrylic enamel of Createx Color, Granby, Conn. 06026, Dr., PH Martins Ready Tex™texture paint by Salis International Inc., Hollywood, Fla. 33020, or a urethane spray paint mixture that includes cellulose acetate butyrate for control of defects when applied too heavily (U.S. Pat. No. 5,520,963 which is included for reference), a coating material which contains a thermosetting carboxy-hydroxy acrylic copolymer cross-linked by polyisocyanates, polypoxides, or aminoplast resins, and also containing cobalt metal organic dyes, and chrome metal organic dyes as used on automobiles (see U.S. Pat. No. 4,598,020 incorporated herein by reference), a latex paint where a distilled isocyanate is reacted with an alkynol to form urethane and then to form 3-iodo-2-propynylbutyl carbamate without the use of trialkyamine as a catalyst to prevent yellowing (see U.S. Pat. No. 5,554,784 incorporated herein by reference), or other specialized airbrush dyes or paint mixtures such as Chromabase™ etc.

For protection of the ornamental design an ultraviolet absorber (UVA) is preferably either mixed into a clear coat or mixed directly in with the dye/paint, to prevent fading, discoloration or cracking from exposure to intense sunlight. Examples of suitable ultraviolet absorbers include benzotriazoles such as tinuvin 1130™, tinuvin p™, and tinuvin 384™ (trademark, CIBA GEIGY) which are added to the clear coat, orthohydroxybenzophenones; triphenyltriazines and oxanilides, which are added to the dye/paint, or an ultraviolet absorbing amino compound that contains a hydroxyphenyl group, one amino group, formaldehyde, and at least one alcohol, which is mixed with the dye/paint's basic compound and can be applied as a clear coat or with a inorganic or organic pigment added. Other examples of ultraviolet absorbers can be found in U.S. Pat. Nos. 5,487,914, 5,426,131, and 4,319,016, the disclosures of which are incorporated herein by reference. The purpose of the ultraviolet absorber is to prevent the color from fading, discoloring, or cracking under intense sunlight.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An ornament for an antenna, comprising a flexible, generally planar body having first and second surfaces and a plurality of apertures, said apertures extending along a line and dimensioned to receive the antenna therethrough, said planar body sufficiently flexible and resilient to bend between a flat state and a bent state; wherein when said ornament is in the bent state, said antenna can easily pass through said apertures, and when said ornament is released from said bent state, said ornament tends to revert to the flat state; and wherein said ornament is held vertically along said antenna by the friction created when said planar body is woven around said antenna.

2. An ornament for an antenna as in claim 1, wherein said generally planar ornament is constructed of a plastic.

3. An ornament for an antenna as in claim 1, wherein said apertures are in the shape of elongate slots.

4. An ornament for an antenna as in claim 1, wherein said ornament bears a printed image.

5. An ornament for an antenna as in claim 4, wherein said image is in the form of a human figure.

6. An ornament for an antenna as in claim 4, wherein said printed image is in the form of an animal.

7. An ornament for an antenna as in claim 4, wherein said printed image is in the form of a vehicle.

8. An ornament for an antenna as in claim 1, wherein said ornament is in the form of a dive flag.

9. An ornament for an antenna as in claim 1, wherein said generally planar body is between 1 and 3 mm in thickness.

10. An ornament for an antenna as in claim 1, wherein said planar body is formed of a thermoplastic elastomer.

11. An ornament for an antenna as in claim 1, wherein said planar body includes two slot-like apertures for receiving said antenna.

12. An ornament for an antenna as in claim 1, wherein said planar body includes three slot-like apertures for receiving said antenna.

13. A method of ornamenting an antenna having a terminal end, the method comprising:

(a) obtaining an ornament comprising a flexible, generally planar body having first and second surfaces and a plurality of apertures, said apertures extending along a line and dimensioned to receive the antenna therethrough, said planar body sufficiently flexible and resilient to bend between a flat state and a bent state;

(b) bending said ornament to the bent state;

(c) threading said antenna through said apertures; and (d) releasing said ornament from said bent state to allow shape memory to revert the ornament to the planar body, whereby said ornament is securely mounted to said antenna by friction created when said planar body is woven around said antenna.

14. A process as in claim 13, wherein said generally planar ornament is constructed of a plastic.

15. A process as in claim 13, wherein said apertures are in the shape of elongate slots.

16. A process as in claim 13, wherein said ornament bears a printed image.

17. A process as in claim 16, wherein said image is in the form of a human figure.

18. A process as in claim 16, wherein said image is in the form of an animal.

19. A process as in claim 16, wherein said image is in the form of a vehicle.

20. A process as in claim 13, wherein said ornament is in the form of a dive flag.

21. A process as in claim 13, wherein said generally planar body is between 1 and 3 mm in thickness.

22. A process as in claim 13, wherein said planar body is formed of a thermoplastic elastomer.

23. A process as in claim 13, wherein said planar body includes two slot-like apertures for receiving said antenna.

24. A process as in claim 13, wherein said planar body includes three slot-like apertures for receiving said antenna.

* * * * *